(12) United States Patent
Zhu

(10) Patent No.: US 10,798,913 B2
(45) Date of Patent: Oct. 13, 2020

(54) PET CAGE

(71) Applicant: Hongwen Zhu, Shanghai (CN)

(72) Inventor: Hongwen Zhu, Shanghai (CN)

(73) Assignee: SHANGHAI NEOCRAFT TOOL CO., LTD., Shanghai (CN)

( * ) Notice: Subject to any disclaimer, the term of this patent is extended or adjusted under 35 U.S.C. 154(b) by 173 days.

(21) Appl. No.: 15/145,660

(22) Filed: May 3, 2016

(65) Prior Publication Data

US 2017/0318777 A1 Nov. 9, 2017
US 2020/0146257 A9 May 14, 2020

(30) Foreign Application Priority Data

Feb. 1, 2016 (CN) .................... 2016 2 0101518 U

(51) Int. Cl.
*A01K 1/035* (2006.01)
*A01K 1/02* (2006.01)

(52) U.S. Cl.
CPC ............. *A01K 1/0356* (2013.01); *A01K 1/02* (2013.01)

(58) Field of Classification Search
CPC .. A01K 1/0245; A01K 1/0272; A01K 1/0236; A01K 1/0035; A01K 1/034; A01K 1/02; A01K 1/033; A01K 1/0209; A01K 31/08; A01K 1/032
USPC ........ 119/453, 498, 499, 501, 502, 474, 481
See application file for complete search history.

(56) References Cited

U.S. PATENT DOCUMENTS

| 5,016,926 | A | * | 5/1991 | Sharp | ......................... E05C 1/04 |
| | | | | | 292/42 |
| 6,073,587 | A | * | 6/2000 | Hill | ........................ A01K 1/00 |
| | | | | | 119/474 |
| 7,377,231 | B2 | * | 5/2008 | Tsai | ....................... E04H 15/50 |
| | | | | | 119/474 |
| 2006/0068946 | A1 | * | 3/2006 | Harrell | ................. A63B 71/022 |
| | | | | | 473/446 |
| 2006/0236952 | A1 | * | 10/2006 | King | ....................... A01K 1/03 |
| | | | | | 119/499 |
| 2012/0227675 | A1 | * | 9/2012 | Link | .................... A01K 1/0017 |
| | | | | | 119/474 |
| 2013/0152867 | A1 | * | 6/2013 | Kaneda | .................. A01K 1/034 |
| | | | | | 119/502 |
| 2014/0216353 | A1 | * | 8/2014 | Cantwell | .............. A01K 1/0017 |
| | | | | | 119/481 |
| 2015/0351363 | A1 | * | 12/2015 | Nussbaum | ............. A01K 1/035 |
| | | | | | 119/480 |

(Continued)

*Primary Examiner* — Peter M Poon
*Assistant Examiner* — Jeffrey R Larsen
(74) *Attorney, Agent, or Firm* — Treasure IP Group, LLC

(57) ABSTRACT

A pet companion cage is disclosed herein, has three or more rectangular metal fence panels, the rectangular metal fence panels are configured to be connected to each other on sides to form an enclosed area, wherein each rectangular metal fence panel is connected to a neighboring rectangular metal fence panel on both sides through hinges or latches. A supporting beam is provided on the top of each rectangular metal fence panel. All the supporting beams meet above a center of the pet companion cage, being fixed with a plastic member. A tarpaulin is placed over the supporting beams to cover pet cages. At least one of the rectangular metal fence panels has a feeding opening. The feeding opening has a door panel. The feeding opening is positioned on the top half of the rectangular metal fence panel.

6 Claims, 8 Drawing Sheets

(56) References Cited

U.S. PATENT DOCUMENTS

2016/0374309 A1* 12/2016 Weingart ............... A01K 1/034
                                                      248/346.06
2017/0314291 A1* 11/2017 LeMoine ................ E04H 15/64

* cited by examiner

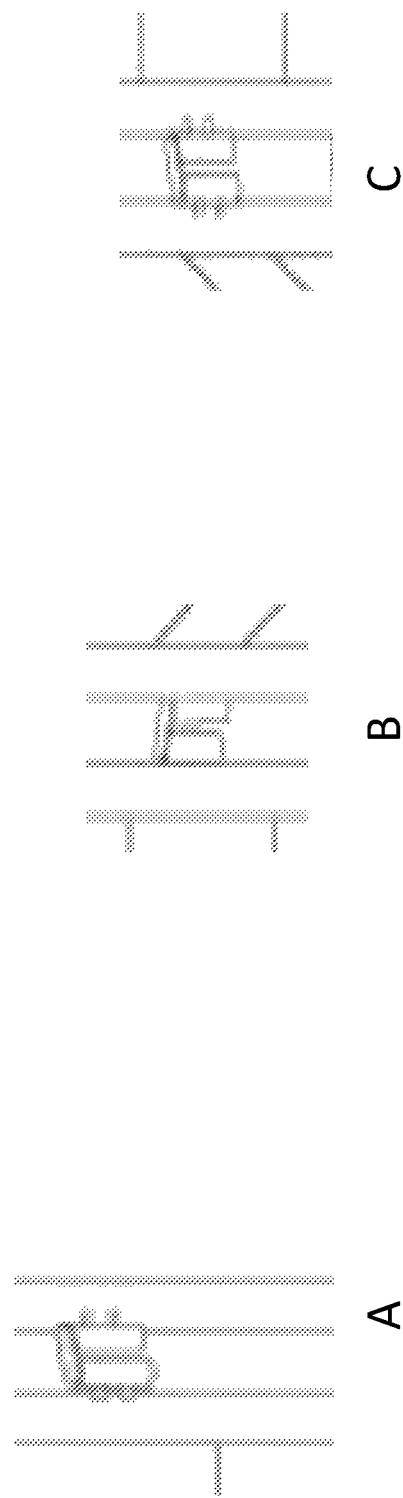

PET CAGE

CROSS REFERENCE TO RELATED APPLICATION

This application claims priority to Chinese Application No. 201620101518.9, filed on Feb. 1, 2016, which is hereby incorporated by reference in its entirety.

TECHNICAL FIELD OF THE DISCLOSURE

This patent application relates, in general, to the art of animal and agriculture, and more particularly, to the art of systems and methods of a animal cage, specifically a pet cage.

BACKGROUND OF THE DISCLOSURE

In the prior art, a cage assembly made of multiple pieces are often used to provide housing for a pet. The pet cage assembly is made of multiple pieces of uniform rectangular metal fence panels. The uniform rectangular metal fence panels are connected to form an enclosure. The number of uniform rectangular metal fence panels used to form the enclosure can be increased or decreased according to the area need to be provided for the pet. The individual rectangular metal fence panel can be easily taken apart and moved away.

SUMMARY OF THE DISCLOSURE

The objective of the present invention is to provide an animal or pet cage. The pet cage intends to solve the technical problem that a pet can escape at the time of feeding because the feeding opening is positioned too low at the pet cage.

The pet cage, disclosed in the present invention, comprises three or more rectangular metal fence panels. The rectangular metal fence panels are configured to be connected to each other on either side to form an enclosed area. Wherein each rectangular metal fence panel can be connected to a neighboring rectangular metal fence panel on both sides through a hinge structure or a latch structure. A supporting beam is provided for each rectangular metal fence panel and extends horizontally from a top of the rectangular metal fence panel to above the center of the pet cage. One end of all the supporting beams meet above the center of the pet cage. A tarpaulin is placed over all the supporting beams to form a cover of the pet cage. At least one of the rectangular metal fence panels has a feeding opening, and the feeding opening has a door panel, characterized in that the feed opening is positioned on a top half of the rectangular metal fence panel.

Further, all the supporting beams are connected to a same connecting member above the center of the pet cage pet.

Further, one side of the door panel is connected to a rectangular metal fence panel through a hinge structure, and the other side of the door panel has a latch, an adjacent rectangular metal fence panel is provided with a latch base, and the latch base is configured to receive the latch.

Further, the latch is inserted to the latch base from a position under the latch base and moves upwardly, and a reset spring is disposed between the latch and door panel, configured to move the latch upwardly.

Further, a bottom end of each supporting beam is hingely attached to the top of a corresponding rectangular metal fence panel. One end of the all the supporting beams all meet above the center of the pet cage and are connected together by a first plastic member to form a joint connection. The joint connection structure not only provides fixture for the top portion of the pet cage and also serves as supporting structure for the tarpaulin cover.

Further, the bottom corners of any two adjacent rectangular metal fence panels are fixedly connected through a second plastic member, in order to stabilize the entire cage structure.

The pet cage disclosed herein has advantage over the prior arts. In the present invention, the feeding opening is placed on the top half of the rectangular metal fence panel, to avoid the pet inside the cage to escape during the feeding. The latch is inserted to the latch base from a position under the latch base. A reset spring is used secure the latch upwardly to prevent the door panel to be opened by the pet inside the cage.

DESCRIPTION OF THE DRAWINGS

FIGS. 4-6 provide enlarged pictures of areas of A, B, and C of FIG. 1.

DESCRIPTION OF THE EMBODIMENTS

Implementation

Embodiment 1

Figure 1:
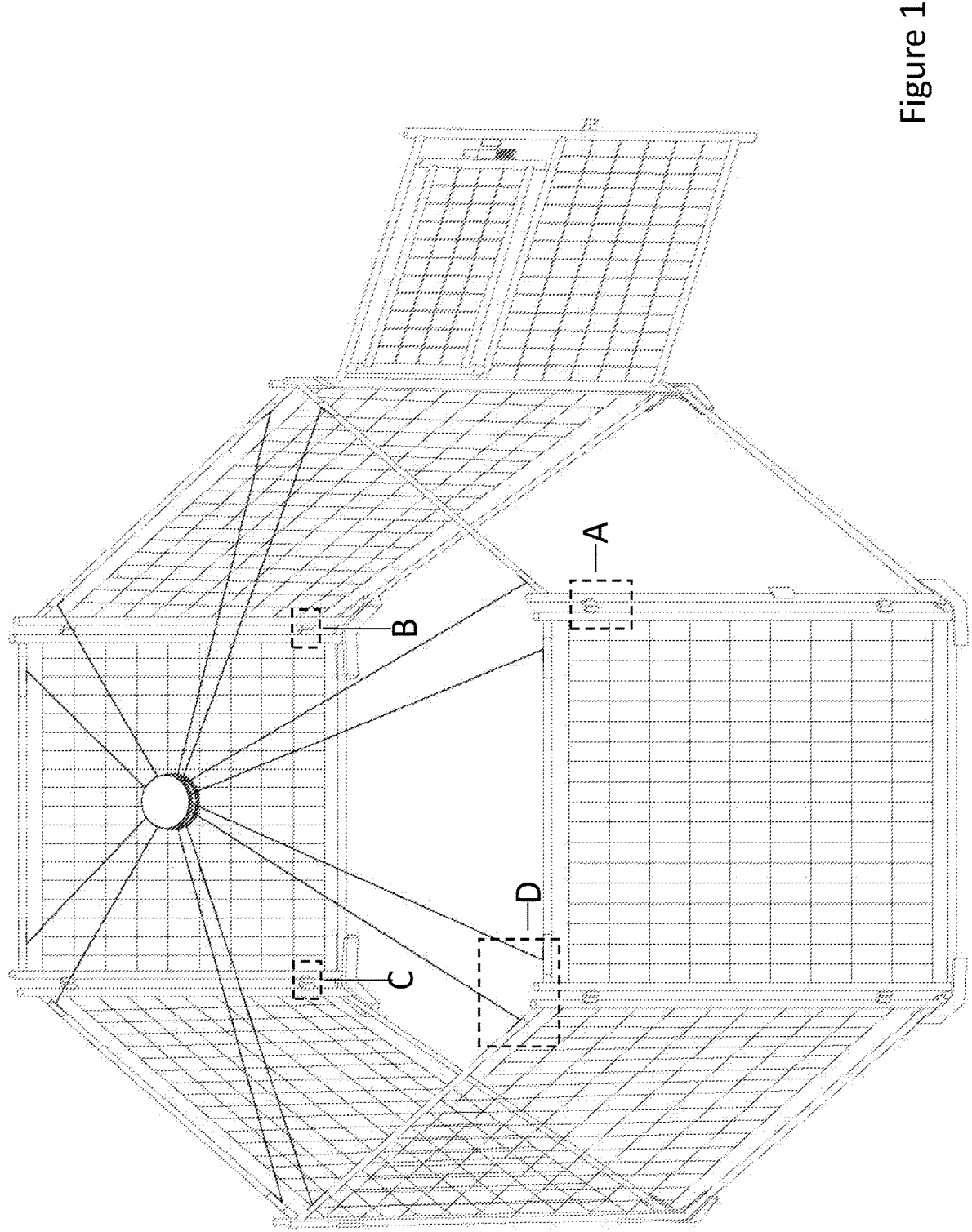
FIG. 1 is an illustration of the pet cage in accordance with the present invention.
Figure 2:
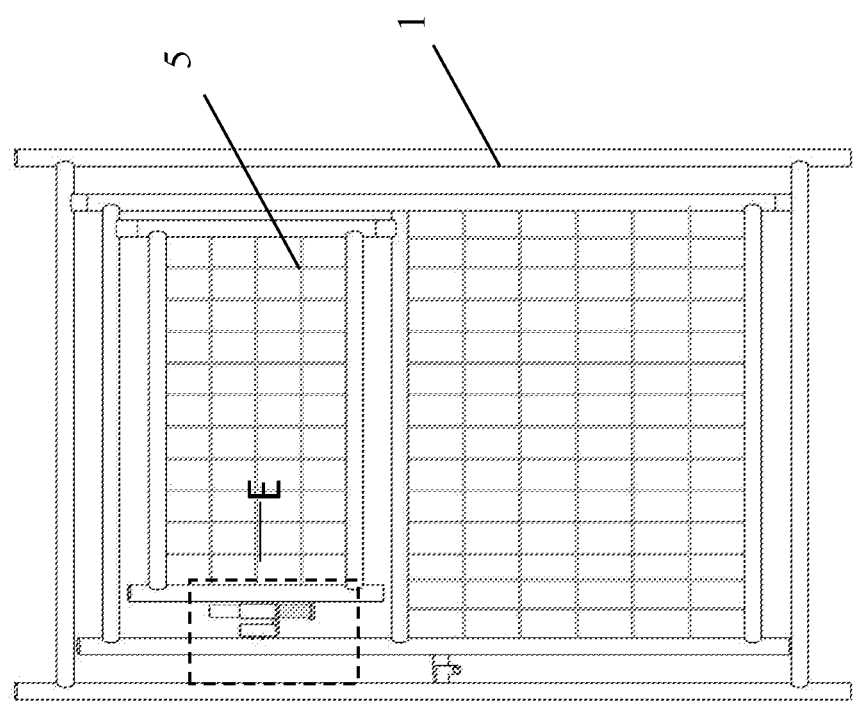
FIG. 2 is an illustration of the feeding opening of the pet cage in accordance with the present invention.
Figure 3:
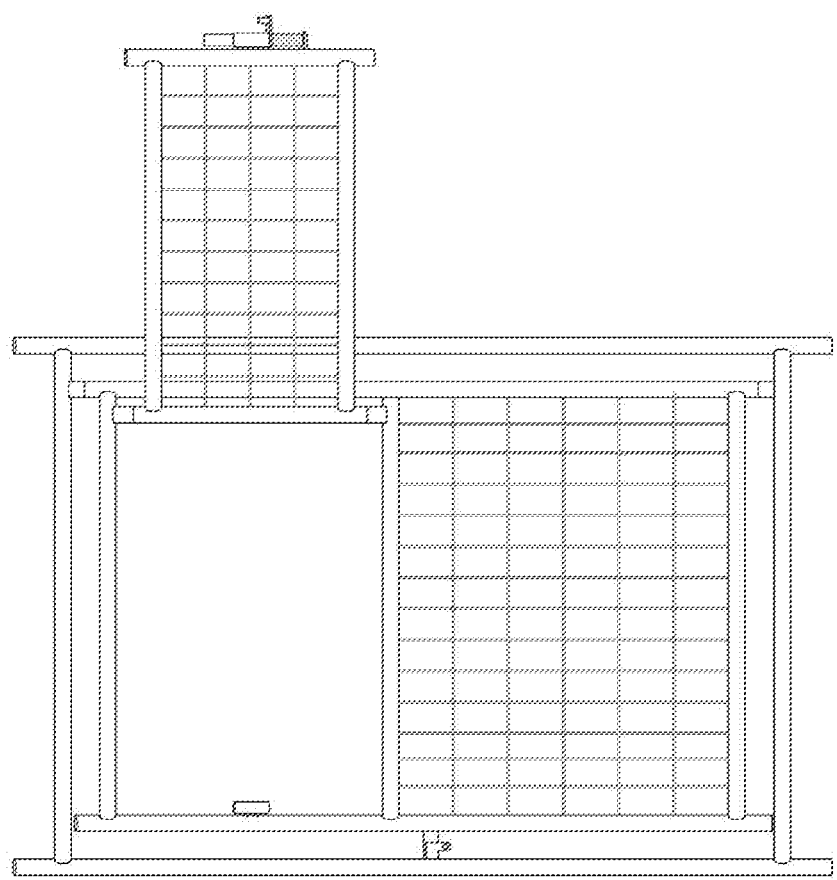
FIG. 3 is an illustration of the feeding opening of the pet cage, when the feeding door is open, in accordance with the present invention.
Figure 8:
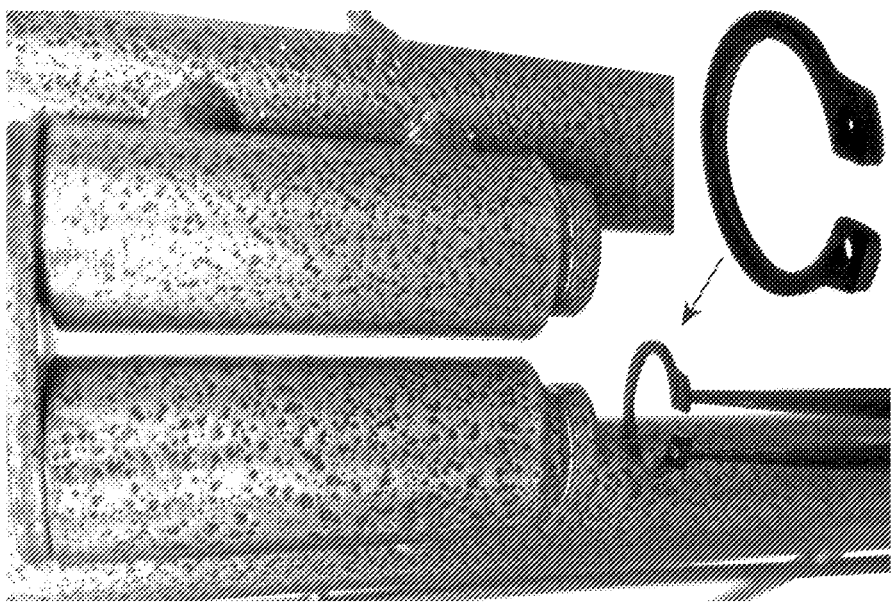
FIGS. 7-8 provide detail illustration of a latch structure for the hinge in FIGS. 4-6.
Figure 7:
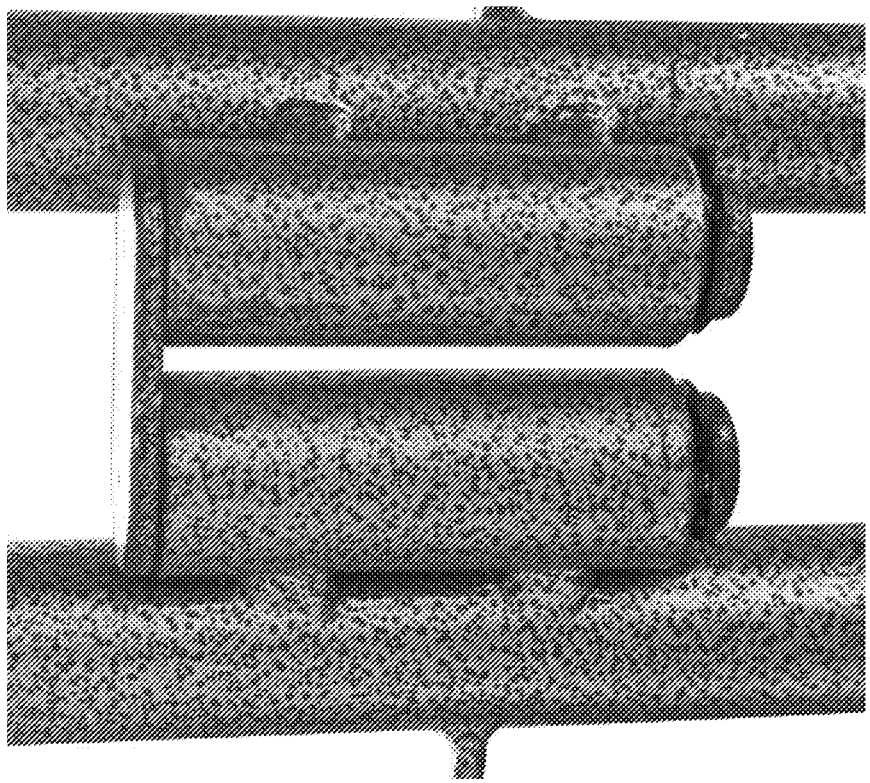
Figure 9:
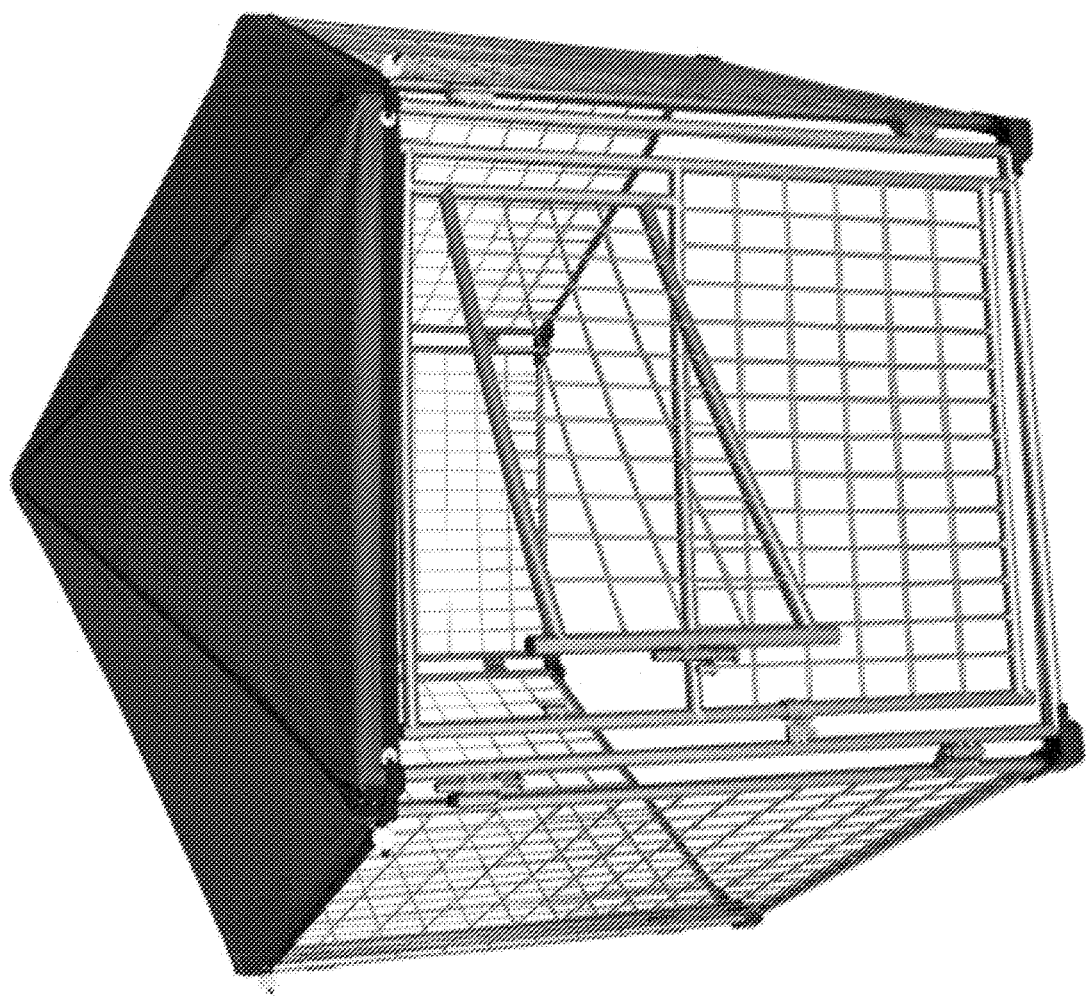
FIG. 9 provides an illustration of a cover of the present invention.
Figure 11:
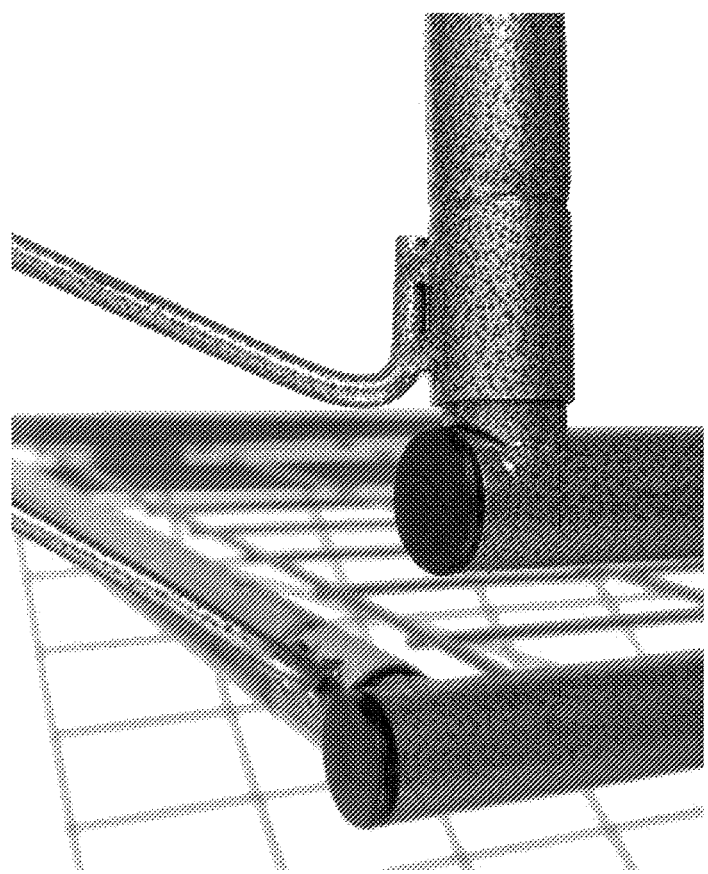
FIGS. 10-12 provide enlarged pictures of areas of D, and E of FIG. 1.
Figure 10:
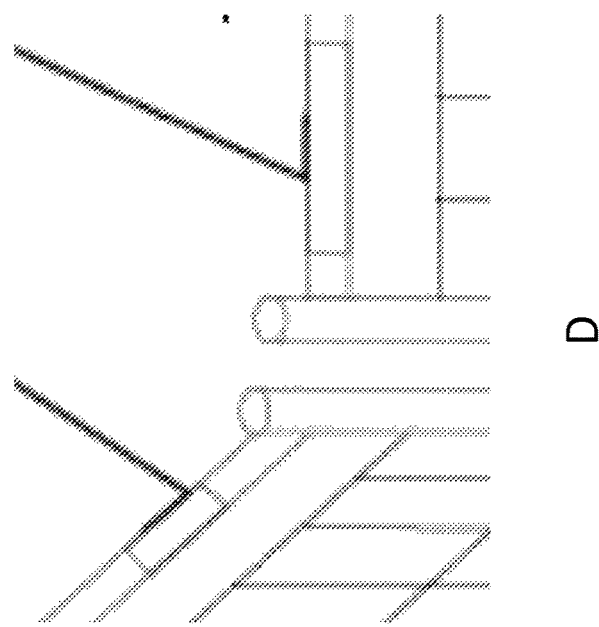
Figure 12:
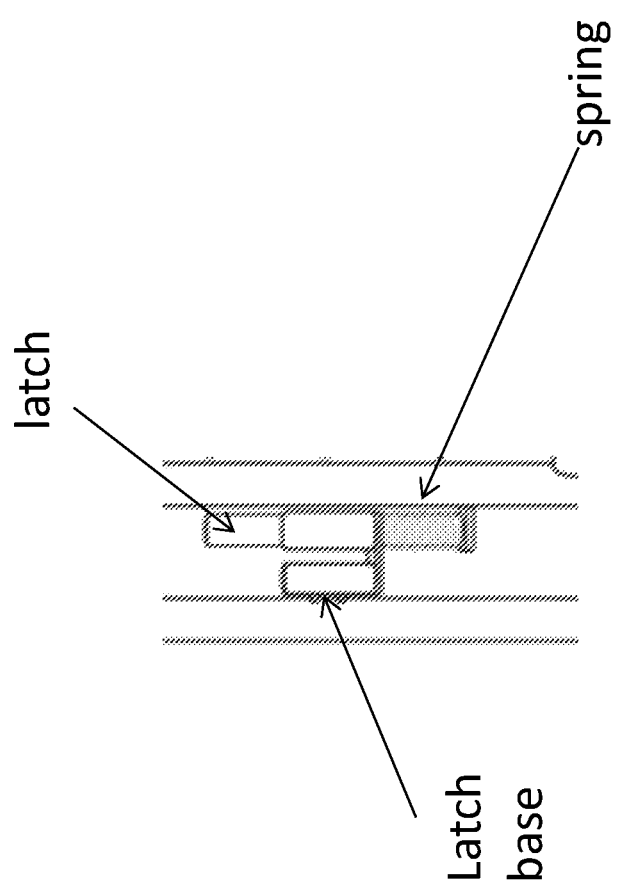

Referring to FIG. 1, FIG. 2 and FIG. 3, the pet cage disclosed in the present invention, have three or more rectangular metal fence panels 1. The rectangular metal fence panels 1 are connected to each other on the sides to form an enclosed area. Any of the rectangular metal fence panels 1 can be connected to another neighboring rectangular metal fence panel on both sides through a hinge structure or a latch structure. Any rectangular metal fence panel 1 is provided with a supporting beam 2 on the top. The supporting beam 2 extends from the top of the rectangular metal fence panel 1 to above the center of the animal cage. One ends of all the supporting beams are gathered to above the center of the animal cage. All the supporting beam 2 are covered by a piece of a tarpaulin (not shown) to form a cover of the pet cage. At least one of the rectangular metal fence panel 1 has a feeding opening 3. The feeding opening has a door panel 5, Wherein, the feed opening 3 is positioned on a top half of the rectangular metal fence panel 1.

Further, one ends of all the supporting beams 2 are connected to a same connecting member 4, above the center of the pet cage pet.

Further, one side of the door panel 5 is connected to a rectangular metal fence panel 1 through a hinge structure, and the other side of the door panel 5 has a latch, an adjacent rectangular metal fence panel is provided with a latch base, and the latch base is configured to receive the latch.

Further, the latch is inserted to the latch base from a position under the latch base and moves upwardly, and a reset spring is disposed between the latch and door panel 5, configured to move and secure the latch upwardly.

Further, a bottom end of each supporting beam 2 is hingely attached to the top of a corresponding rectangular metal fence panel 1. One end of the all the supporting beams all meet above the center of the pet cage and are connected together by a plastic member 4 to form a joint connection. The joint connection structure not only provides a fixture for the top portion of the pet cage and also serves as a supporting structure for the tarpaulin cover.

Further, the two bottom corners of any two adjacent rectangular metal fence panels are fixedly connected through a plastic member 6, in order to stabilize the entire cage structure.

In the present invention, the feeding opening 3 is placed on the top half of the rectangular metal fence panel 1, to avoid the pet inside the cage to escape from the feeding opening 3 during the feeding. The latch is inserted to the latch base from a position under the latch base. A reset spring is used secure the latch upwardly to prevent the door panel 5 to be opened by the pet inside the cage.

I claim:

1. A pet cage assembly, comprising:
    [1] a group of six rectangular metal panels configured to be serially linked to form a final assembly with an enclosed space,
    wherein each said panel is configured to be connected on the left to a first neighboring panel and to be connected on the right to a second neighboring panel, both the first and second neighboring panels belonging to the group of the six rectangular metal panels,
    wherein each said panel has a first vertical bar at the left edge of the panel, a second vertical bar at the right edge of the panel, a first horizontal bar connected to both the first and second vertical bars near a top portion of the vertical bars such that the first horizontal bar is the topmost bar of the panel, and a second horizontal bar connected to both the first and second vertical bars near a bottom portion of the vertical bars such that the second horizontal bar is the bottom-most bar of the panel,
    wherein each said neighboring panel has a third vertical bar at the left edge of the neighboring panel, a fourth vertical bar at the right edge of the neighboring panel, a third horizontal bar near the top of the neighboring panel and a fourth horizontal bar near the bottom of the neighboring panel,
    wherein the first vertical bar of each said panel is configured to be connected a fourth vertical bar of the associated first neighboring panel through a first inverted U-shaped hinge structure and a first pair of latch structures in a cylinder shape, the second vertical bar of each said panel is configured to be connected to a third vertical bar of the second neighboring panel through a second inverted U-shaped hinge structure and a second pair of latch structures in a cylinder shape;
    wherein the bottom corners of the first vertical bar and the fourth vertical or the bottom corners of the second vertical bar and the third vertical bar rest on or are inserted into a second plastic member;
    [2] a group of six supporting beams, one for each rectangular metal panel,
    wherein a lower end of the supporting beam is attached to the first horizontal bar of the panel via a tube-like cover surrounding the first horizontal bar, both the lower end of the supporting beam and the tube-like cover being disposed at a distance away from a corner of the first horizontal bar,
    wherein the lower end of the supporting beam comprises a short leg and a long leg,
    wherein the lower end of the supporting beam is conformally and permanently connected to the tube-like cover through the short leg along a length direction tube-like cover and oriented along the horizontal direction of the first horizontal bar,
    wherein each supporting beam configured to extend from a top of the panel to a position above a center of the pet cage such that the top ends of the six supporting beams meet at a common position above the center of the pet edge and are joined by a common first plastic connection member
    [3] wherein at least one rectangular metal panel with a feeding opening, the bottom edge of the feeding opening is above the middle point of the first vertical bar or the distance between the top edge of the feeding opening and the first horizontal bar is less than the distance between the bottom edge of the feeding opening and the second horizontal bar.

2. The pet cage assembly of claim 1, wherein each supporting beam of the pair of supporting beams has a top end, and the two top ends of the same pair of the supporting beams are joined together to form a connection and the connections between the two top ends of the pair of the supporting beams are further joined by means of the first common first plastic connecting member above the center of the pet cage.

3. The pet cage assembly of claim 1, wherein: the side of each rectangular metal fence panel is connected to the neighboring rectangular metal fence panel through the inverted U-shaped hinge structure and the pair of cylindrical shaped latch structures, and the inverted U-shaped hinge structure is provided with a pair of latch bases, and the pair of latch bases configured to receive a pair of latch rings.

4. The pet cage assembly according to claim 1, wherein: a second latch assembly is provided for the door panel, which is made of a second latch and a second latch base, wherein the second latch is inserted to the second latch base from a position under the second latch base and moved upwardly, a reset spring is disposed between the second latch and door panel, configured to be moved upwardly to secure the second latch.

5. The pet cage assembly as claimed in claim 1, wherein the lower end of each supporting beam is hingedly attached to the top of each rectangular metal fence panel.

6. The pet cage assembly as claimed in claim 1, capable to connect to another same pet cage assembly through either the first vertical bar at the left edge of the panel, or the second vertical bar at the right edge of the panel.

\* \* \* \* \*